Sept. 27, 1955  F. SCHNUR  2,719,032
TREATMENT OF GASES WITH WASHING LIQUIDS
Filed Aug. 8, 1951  2 Sheets-Sheet 1
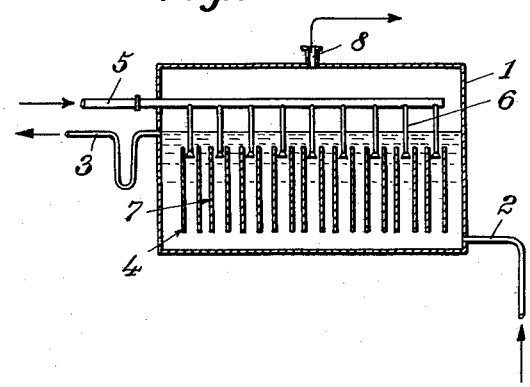
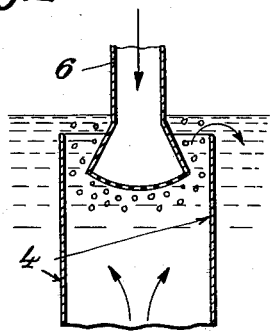
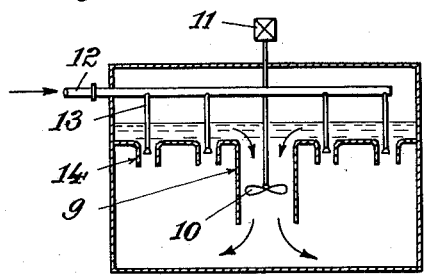
Inventor:
Friedrich Schnur
by
Burgess + Dinkelage
Attorneys

United States Patent Office 2,719,032
Patented Sept. 27, 1955

2,719,032

TREATMENT OF GASES WITH WASHING LIQUIDS

Friedrich Schnur, Oberhausen-Sterkrade, Germany, assignor to Ruhrchemie Aktiengesellschaft, Oberhausen-Holten, Germany, a corporation of Germany Application August 8, 1951, Serial No. 240,891

Claims priority, application Germany August 23, 1950

1 Claim. (Cl. 261—21)

This invention relates to improvements in the treatment of gases with washing liquids.

Gases from and for technical processes must often be freed from single gas components with the use of washing liquids. In some cases these gases to be removed consist of undesirable impurities such as carbon dioxide, sulfur dioxide, hydrogen sulfide, or gaseous cyanogen compounds. In other cases valuable components present in only small concentrations, such as ammonia, ethylene or acetylene must be removed from gas mixtures. When a dry treatment of gases with active material is impossible or uneconomical, the gases to be purified are usually washed with a liquid media such as water or alkaline solutions, in which the gaseous components to be isolated are more or less readily soluble. In such an operation pressures above atmospheric are usually employed in order to increase the solubility of the gaseous component to be isolated and to make a simple degassing of the absorption solution possible through a subsequent decrease of the pressure. Liquid gas contacting is also necessary when chemical conversions between gas components and liquids have to be effected.

Washing towers or washing columns in which the washing solution enters at the top and the gases to be treated are introduced from below, are conventionally used for the technical washing of gases. These washing towers are generally quite high and are filled with filling bodies perforated tin sheets, bell bottoms, or similar installations to improve the washing efficiency. Due to their relatively great height and the required intensity of the circulation of the liquid, these installations require a relatively large amount of energy for operation.

The separation of relatively insoluble gas components such as carbon dioxide from technical gas mixtures require considerably longer periods of contact with the washing liquid than are normally required in normal operation such as in distillation columns. For this purpose prior to the present invention, absorption towers were usually used in which the absorption liquids were circulated several times through the entire tower or through the various parts of the tower in order to obtain a long period of stay of the liquid in the tower. In other installations only a part of the liquid is contacted with the gas flow in stages. During the absorption of the difficultly soluble gases it was impossible to keep the liquids in the tower a sufficient length of time to effect absorption of the gas as close to the point of saturation as was desired. In most instances the point of saturation was far from being reached as to do so would involve the use of a tower so large as to be impractical from an economic standpoint. Due to this, a greater amount of heat was required for the degassification of fairly large quantities of the washing liquid. These difficulties present a great problem in the industry, but due to the conventional washing principle and the design of the customary washing towers and columns whose greatest part is taken up by the gas space and in which the time of stay of the liquid depends on its rate of fall through the filling body or on the capacity of the bell bottoms, these disadvantages were unavoidable.

One object of this invention is a method and apparatus for the treatment of gases with washing liquids which will avoid the aforementioned disadvantages. This and further objects will become apparent from the following description read in conjunction with the drawing, in which:

Fig. 1 diagrammatically shows a washing apparatus according to the invention;

Fig. 2 shows a detailed construction of a gas nozzle shown in Fig. 1;

Fig. 3 diagrammatically shows another embodiment of a washing apparatus according to the invention with a liquid circulator;

Figure 5:
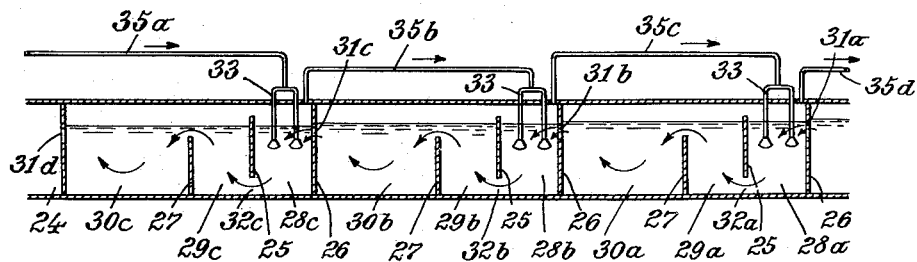
Fig. 5 shows still another embodiment of a washing apparatus according to the invention for multiple stage washing.
Figure 6:
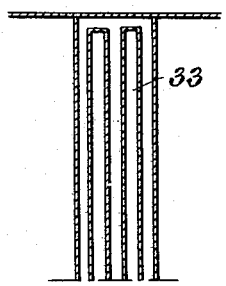
Figure 7:
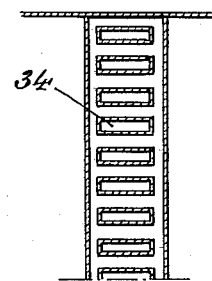

Fig. 6 diagrammatically shows detailed construction of the gas nozzles shown in Fig. 5 and, Fig. 7 diagrammatically shows another embodiment of the gas nozzles shown in Fig. 5.

It has now been found according to the invention that a considerably better washing results and surprisingly large savings in heat and energy as well as in the cost of installation can be obtained if when operating according to the multiple stage washing principle the time of stay of the washing liquid in the gas contact-area is considerably increased, while the time of stay of the gas remains the same or is less than was essentially used heretofore. This is particularly effective in the case of slowly soluble gases. When proceeding according to the invention, both media must be intimately mixed and the time of stay of the gas and liquid in each stage must be chosen so that the maximum practical absorption of the gas by the liquid is effected. This time is usually the time required for the approximate saturation of the liquid with the gas component. Due to the fact that no appreciable volume is required for gas space the size of the separate washing stages may be considerably reduced.

When, according to the invention, it is necessary to separate, by washing, gas components which are soluble to a large degree, but only slowly, and where a relatively small amount of liquid per unit gas volume is sufficient, the kinetic energy of the gas fed into the liquid is generally sufficient to insure an intimate mixture and a sufficient circulation of the liquid in a suitably designed equipment. An additional improvement of the washing effect may be obtained if a circulation of the liquid is forced by a built-in stirring mechanism.

In cases where the gas components are not only difficult to dissolve in the liquid, but in which the saturation point is relatively small, then large amounts of liquid are required for the treatment of relatively small volumes of gas. In cases such as this the kinetic energy of the blown-in gas is not sufficient to produce an effective circulation and surface formation within the liquid when the gas is blown in in the small quantities compatible with commercial economy. Thus, when this situation is encountered a better result is obtained if the liquid is forced to flow downward, and its kinetic energy is utilized to carry the blown-in gas along with it in order to produce a sufficient time of contact and a sufficient surface formation between the two media for the absorption to be effected.

In washing out relatively insoluble gaseous ingredients, as, for example, the washing out of $CO_2$ by means of alkaline liquids, the process according to the invention produces a considerably greater enrichment of the liquid so that a considerable saving of energy is effected by driving off the carbon dioxide in successive stages. In the washing out of carbon dioxide by means of water where only about one volume of $CO_2$ is taken up by one volume of water at atmospheric pressure the new process according to the invention allows an economical operation at atmospheric pressure where heretofore this washing could only be effected at pressures above atmospheric. It is well known that pressures of at least 8 to 10 atmospheres were conventionally used in washing out carbon dioxide with water. For this purpose considerable quantities of energy were used for the condensation of the gases and the washing water. With the process according to the invention, carbon dioxide may be washed out with an extraordinary low consumption of energy by means of correspondingly larger quantities of water at a very slight increase of the gas pressure. It is only necessary to raise the washing water to a level at which it flows in a direction opposite to the blown-in gas in a free overflow over built-in partitions from stage to stage. The economy of this method of operation is still further increased by an arrangement whereby the charged water can again be freed from the carbon dioxide by blowing air in the opposite direction in successive stages wherein the absorption water has to be raised over a difference in the levels of only about 1.2 meters. Compared to the $CO_2$ water washing under pressure conventionally practiced, the energy consumption of the new process is reduced to approximately 10 to 15%.

Referring to the drawings for a better understanding of the method and for several embodiments of apparatuses for effecting the method according to the invention, in Fig. 1 the washing of the gas according to the invention takes place in the flat containers 1 into which the washing liquid runs through a supply line 2 at the bottom, flowing out through an overflow pipe 3, which insures a fixed quantity of liquid in the container. Similar containers, the number of which is determined by the requirements of the washing process, are put side by side. The hydrostatic differences required between the individual containers are very small, since flow velocities of the liquid of only about 0.3 to 1.0 m./sec. are generally sufficient for washing gases. Numerous partitions 4 are arranged within the container 1, whose lower edges do not extend to the bottom of the container and whose upper edges do not extend to the surface of the fluid. The partitions 4 divide the container 1 into small, individual sections.

The gases are fed in through a collecting pipe 5 which divides into numerous blow pipes 6, which dip a little way into the washing liquid. Only each alternate container compartment, formed by the partitions 4, is provided with a gas blow pipe 6. The relatively small flow energy of the blown-in gases causes in this manner a circulation of the washing liquid, which flows upward in the container compartments provided with the injection nozzles and flows downward again in the adjacent compartments which are not provided with injection nozzles and which can best be seen in Fig. 2. This is so, since the mixture of blown-in gas and liquid formed adjacent the outlets of the pipes 6, as shown in Fig. 2, has a lower specific weight than the washing liquid itself, and will therefore rise in relation thereto. The treated gases leave the washing container 1 through a pipe line 8 in order to be treated in an analogous manner in subsequent washing containers.

If the motion of the washing liquid has to be aided by mechanical auxiliary means, a pipe 9, which neither extends to the bottom of the container nor to the surface of the liquid contents is suitably arranged in the center of the washing container, as shown in Fig. 3. A stirrer blade rotates inside of this pipe 9 at a suitable speed, being propelled, as for example, by an electric motor 11. The gas feed pipe 12 divides into the necessary number of gas injection pipes 13, which are inclosed by pipes 14, which are suitably considerably shorter than the pipe 9, that incloses the stirrer, and also do not extend to the surface of the liquid.

The motion of the stirrer blade 10 can be so regulated that the washing liquid can move from the top to the bottom or from the bottom to the top through the pipe 9. Thus, the acting liquid can be circulated in the same or the opposite direction of the injected gases. For example, in Fig. 4 the gas injection installation works in a direction opposite to the direction of the circulating liquid in order to produce a particularly intensive washing effect.

Figure 4:
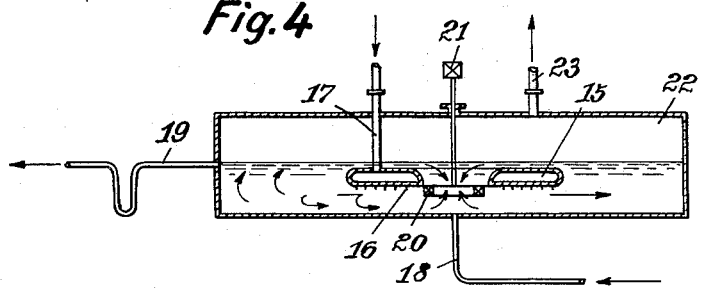
Fig. 4 shows still another embodiment of a washing apparatus according to the invention.

According to Fig. 4, annular tin housings 15 are used to blow in the gases to be washed. On their bottom they are provided with numerous gas injector nozzles to which the gases are conducted through a pipe line 17. By means of the jet opening 16, the gases are intensively diffused within the washing liquid which enters through the pipe line 18 opposite the central opening of the tin housing 15 and is carried off through an overflow pipe 19. Inside of the circular part of the tin housing 15, suitably somewhat below the housing bottom, a stirring apparatus 20, e. g. a bucket wheel, is provided, which is rotated by the driving gear 21. The kinetic energy of the gases coming out of the nozzles 16 and the rotation of the stirring mechanism produce an intensive contact between the washing liquid and the gases to be treated, which results in a particularly advantageous and extensive washing of the gaseous ingredients which are to be isolated. The treated gases leave the treatment container 22 through a pipe line 23.

In the arrangement according to Fig. 4, a gas-washing container of a very small height is sufficient, so that only little energy is needed for the circulation of the washing liquid even if numerous single units are installed one next to the other.

If carbon dioxide is to be washed out of gas mixtures with water, installations according to Figs. 5 to 7 are used. A continuous container 24 is used, which is divided into single adjacent compartments by partitions 25, 26 and 27. In this arrangement relatively narrow container compartments 28a—c, where the gases to be treated are blown in, are followed by larger double sections 29a—c and 30a—c, where the gases separate again from the washing solution and enter the next washing stage. The preliminary separation takes place in the sections 29a—c; the final separation of the remaining small gas bubbles takes place in the sections 30a—c.

The partitions 26 extend to the upper edge of the container 24 but are provided with slits 31a—d near the upper edge of the container for the passage of the washing liquid. The partitions 25 do not extend to the bottom of the container, but have openings 32a—c in their lower parts for the passage of the washing liquid. The upper openings 31a—c are provided at such a level that the liquid entering through opening 31a can flow through all container sections and flow out through the discharge opening 31d.

The gas injectors 33 are arranged in the narrow container sections 28a—c between the partitions 25 and 26. On account of the large volume of the gases to be washed, the gas injectors 33 have, as shown in Fig. 6, either the form of elongated slits, or, as shown in Fig. 7, have numerous injectors 34, one placed beside the other.

The gases to be treated are conducted into the injector nozzles 33 by means of a pipe line 35. The gases are blown through nozzles 33 at a high velocity and are thus injected into the liquid in compartment 28c. The injection velocity of the gases from nozzles 33 is so great that these gases pass downwardly in cocurrent flow with the liquid in compartment 28c and pass into compartment 29c through the opening 32c. From there they are conducted into the compartment 28b through a gas pipe 35b by means of the subsequent nozzles 33. The number of the injector compartments 28a—c and the adjacent compartments where the gases are carried off has to be adapted to the washing process used and to the washing effect desired.

The process according to the invention and the installations provided for its execution can be used not only for the separation of gaseous ingredients, but also for the degasification of absorption solutions exhausted by gas washings. In this case, inert gases are blown into the washing solutions in order to force out the absorbed gases on the basis of their solubility equilibriums. Such a process can be used, for instance, if solutions which have absorbed carbon dioxide have to be freed again from their carbon dioxide content and have to be returned into circulation. In the degasification of washing solutions it is possible to work with gas temperatures which are higher than the temperature of the washed-out gases.

For the process according to the invention, numerous washing liquids can be used. It is also possible to treat gases with acid or alkaline solutions, besides water. The process according to the invention is particularly advantageous if large quantities of gases are to be freed from their carbon dioxide content by a simple method.

I claim:

Apparatus for the treatment of gases with liquids, comprising means defining an elongated, liquid container, complete partition means subdividing said container into multiple stages, including a first stage and a last stage, each such complete partition defining a liquid passage below the liquid surface level of said container, each said stage having a first partial partition extending from above the bottom of said container to above the surface level of said container, and a second partial partition extending from the bottom of said container to below the liquid surface level of said container, means defining a liquid conduit into one end portion of said container, means defining a liquid overflow out of the other end portion of said container, means defining a gas passage into said container terminating in gas nozzles positioned in said last stage below the liquid surface level in said container between said complete partition defining said stage and said first partial partition above the lower terminus thereof, a gas exit defined in each stage, and gas passages from each said gas exit terminating in gas nozzles positioned below the liquid surface level in said container between said complete partition and said first partition in each next preceding stage.

References Cited in the file of this patent

UNITED STATES PATENTS

| | | |
|---|---|---|
| 154,350 | St. John | Aug. 25, 1874 |
| 177,580 | Solvay | May 16, 1876 |
| 507,774 | Ball | Oct. 31, 1893 |
| 2,212,841 | Maxwell | Aug. 27, 1940 |
| 2,221,346 | Durdin | Nov. 12, 1940 |
| 2,243,309 | Daman et al. | May 27, 1941 |
| 2,313,654 | MacLean | Mar. 9, 1943 |
| 2,494,602 | Wright | Jan. 17, 1950 |

FOREIGN PATENTS

| | | |
|---|---|---|
| 48,730 | Denmark | May 7, 1934 |